Figure 1:
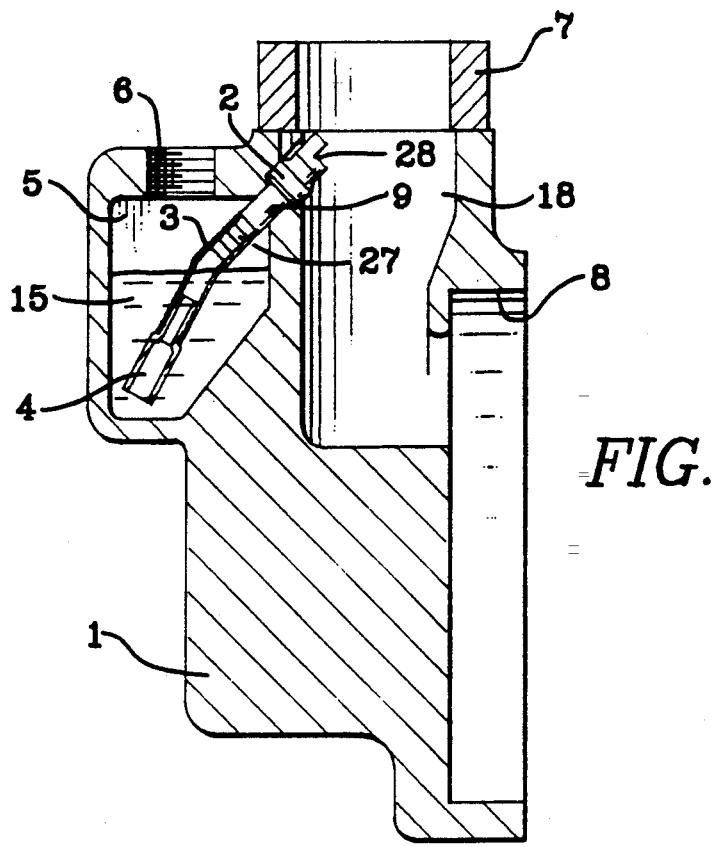

United States Patent [19]

Oetting et al.

[11] Patent Number: 5,123,504
[45] Date of Patent: Jun. 23, 1992

[54] LUBRICATOR

[75] Inventors: Roy E. Oetting, Sayre, Pa.; John J. Pazzaglia, Columbia Cross Roads; Duane S. Gable, Ulster, all of Pa.

[73] Assignee: Ingersoll-Rand Company, Woodcliff Lake, N.J.

[21] Appl. No.: 758,577

[22] Filed: Sep. 12, 1991

[51] Int. Cl.[5] ............................................. F16N 7/30
[52] U.S. Cl. .................................. 184/55.2; 184/6.26; 261/78.2; 261/DIG. 39
[58] Field of Search .................. 184/55.2, 55.1, 6.14, 184/6.26, 50.1, 57, 59; 261/DIG. 39, 78.2

[56] References Cited

U.S. PATENT DOCUMENTS

| | | | |
|---|---|---|---|
| 2,113,506 | 4/1938 | Clough | 184/55.1 |
| 2,261,774 | 11/1941 | Miller | 184/55.2 |
| 2,912,064 | 11/1959 | Friedell | 184/6.26 |
| 3,982,609 | 9/1976 | Bouplon | 184/55.2 |
| 4,234,014 | 11/1980 | Knight | 184/55.2 |

FOREIGN PATENT DOCUMENTS

| | | | |
|---|---|---|---|
| 0865327 | 5/1941 | France | 184/55.2 |
| 0322955 | 12/1929 | United Kingdom | 184/55.2 |

*Primary Examiner*—Ira S. Lazarus
*Assistant Examiner*—Alan B. Cariaso
*Attorney, Agent, or Firm*—Walter C. Vliet

[57] ABSTRACT

A lubricator for pneumatic driven power tools and the like is disclosed which operates on the principle of receiving impact air to pressurize an oil reservoir to provide a metered flow of lubricant in proportion to the amount of air flow in one direction and to bypass the pressure differential created during reverse flow so as to avoid lubricant delivery during reverse flow. The lubricator communicates between a delivery air passageway and a oil reservoir and is provided with parallel passages, one of which extends forward of the other into the air stream to produce a pressure differential.

12 Claims, 2 Drawing Sheets

LUBRICATOR

BACKGROUND OF THE INVENTION

This invention relates generally to lubricators and more particularly to in-line lubricators for pneumatically driven power tools and the like.

In supplying air to pneumatic tools, it is desirable to have finely divided drops of lubricating oil entrained in the air in order to lubricate moving parts with otherwise dry air. In the past the devices have been relatively complicated and have required the use of moving parts which become inoperable if there are contaminants in the oil supply. Normally oil is only required during the working cycle of the power tool.

Prior art oilers have in some cases continuously supplied oil when not needed or only during specific functions such as one shot oilers providing oil at the initiation of the power usage. This often results in excessive oil usage or insufficient oil available for prolonged cycle operation.

The foregoing illustrates limitations known to exist in present lubricators. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a lubricator comprising an elongate body having a first and second end and a periphery extending generally about an elongate axis; the body being provided with a pair of generally parallel passageways, one first of the passageways extending from the first end to an enclosed oil supply cavity and one second of the passageways extending from the first end to an oil supply in the oil supply cavity; the first of the passageways being positioned in an air stream such as to primarily receive impact air to pressurize the oil supply cavity; and the second of the passageways being positioned in the air stream to receive less impact air whereby the second of the passageways is at a lower pressure than the first of the passageways and the oil supply cavity and oil is delivered from the oil supply through the second of the passageways to the first end of the body for disbursement into the air stream when the air stream is flowing.

The foregoing and other aspects will become apparent from the following detailed description of the invention when considered in conjunction with the accompanying drawing figures.

BRIEF DESCRIPTION OF THE DRAWING FIGURES

FIG. 1 is a cross section of a power tool oil and air supply chamber showing a lubricator in partial cross section according to the present invention;

FIG. 2 is a detailed cross section of a lubricator according to the present invention showing its function in one direction of air flow;

FIG. 3 is an enlarged detail of cross section detail of FIG. 1 showing operation of the lubricator in opposite direction of flow; and FIG. 4 is an end view of the lubricator according to the present invention.

DETAILED DESCRIPTION

FIG. 1 shows a power tool body 1 having an air supply line 7 attached thereto. The power tool body 1 is provided with an oil reservoir 5 containing an oil supply !5. Oil is introduced into the oil reservoir 5 through a fill plug bore 6. The bore is sealed by a pipe plug or the like (not shown). A lubricator or oiler according to the present invention 2 is shown installed at an approximate 45 degree angle between the air supply passageway 18 in the power tool body and the oil reservoir 5.

A hose or flexible tube 3 is connected to the lubricator on a hose barb 27 and is utilized to extend the lubricator 2 into the oil supply 15. The hose is further provided at its lower end with a weighted filter/oil supply regulator 4 to assure its lower o suction end remains in the oil supply during operation. The lubricator is installed in an angled bore 9 and is sealed in the bore by means of an "0" ring 19 to prevent air pressure from the supply line 7 and passageway 18 from reaching the oil reservoir 5 except in the manner provided within the lubricator body. Oiler 2 is retained in the angled bore 9 by means of a set screw 17 contacting a groove 26 in the body of the lubricator which is provided for mounting purposes.

The oiler 2 is provided with an impact air inlet bore 10 which proceeds generally axially along the body of the lubricator to an axially oriented inlet air metering bore 11 and finally exits the lubricator via an air inlet cross bore 12. The air inlet bore 10 projects above the lubricator face 28 on a semicircular projection 29.

It may now be appreciated that inlet air 20 flowing in the air supply line 7 into the supply chamber 8 of the power tool passes over the extended portion of the oiler body projecting into the air supply line. A portion 21 of the air flow to the power tool impinges on the impact air inlet bore 10 in the projection 29 and proceeds by way of the impact air inlet bore 10 through the air inlet air metering bore 11 to inlet air cross bore 12 and ultimately into the oil reservoir 5 where it pressurizes the oil reservoir.

An oil supply bore 13 located generally parallel to the impact air inlet bore and located on the centerline of the power tool body extends from the oil reservoir side to intersect with an oil discharge bore 14 slightly offset from the centerline and extending from the oil supply bore to face 28 at the passageway 18.

When air is flowing in the air supply line, as shown by the air flow arrows 20 in FIG. 2, it will impinge first upon the impact air inlet bore. The oil discharge bore 14, being in the shadow of the air impact air inlet bore by virtue of its being recessed relative to the extended face of the inlet bore on projection 29, receives less impact air and therefore is at a lower pressure. The result is that the impact air pressurizes the oil reservoir slightly and oil is forced to flow from the oil supply 15 through the weighted filter/regulator 4 into the flexible supply line and through oil supply bore 13 and oil discharge bore 14 respectively to deposit oil droplets 16 in the air stream.

Thus, in operation when supplying oil, the supply air to the tool impinges on the step cylindrical projection of the lubricator body. The air inlet is subjected therefore to ram or impact air while the oil outlet 14 is shielded from direct air flow. Differential pressure at these two points develops a pressure in the reservoir and forces the oil from the reservoir into the air supply.

Figure 2:
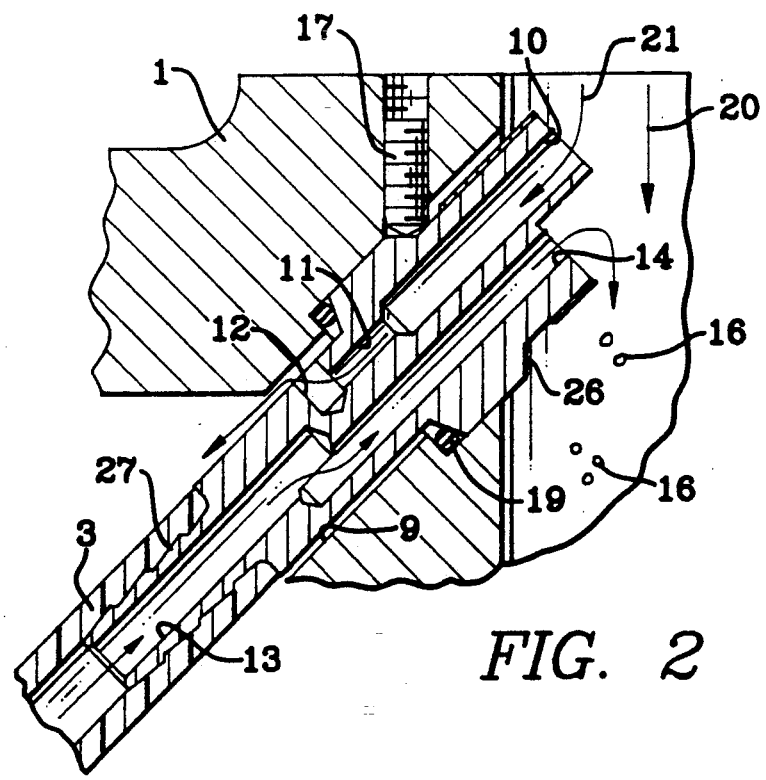
Figure 3:
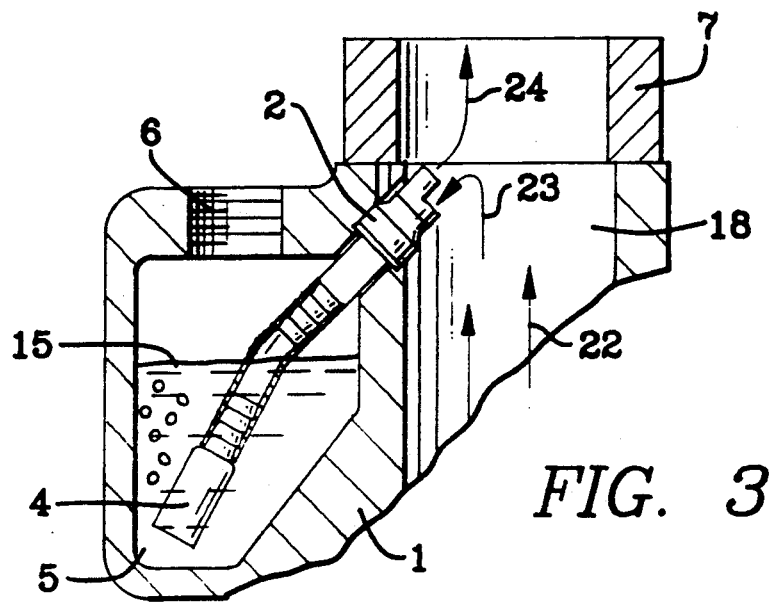
Figure 4:
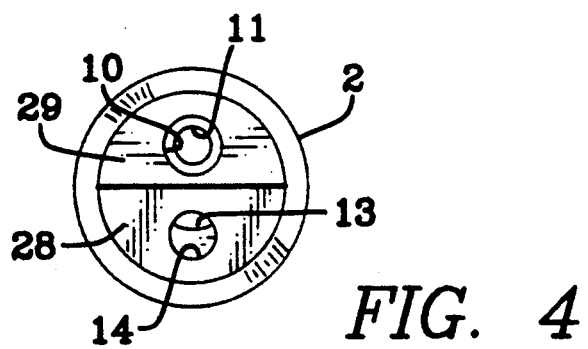

It is common to have reversed air flow in such supply lines, particularly if the lubricator is located in the tool plenum and a reversing motor is provided. If the air flows in the opposite direction of FIG. 2, as shown in FIG. 3, the exhausting air 22 creates a local static high pressure area at the oil inlet and the air slipping over the air inlet experiences a relatively low pressure area. This results in air 23 entering the oil reservoir through the oil outlet and air 24 exits through the air inlet as shown in FIG. 3. However, since the inlet from the oil reservoir to the air inlet cross bore is above the oil supply, the lubricator does not supply oil in the exhaust direction.

Thus, it can be appreciated that the present invention results in the desirable feature of having oil supplied in a controlled meter fashion in response to the flow of inlet air in one direction while preventing the unnecessary waste or discharge of oil into the exhaust air.

Having described the invention, what is claimed is:

1. A lubricator comprising:

an elongate body having a first and second end each formed substantially perpendicular to an elongate axis and an encircling periphery extending generally about said elongate axis;

said first end being positioned to extend into an air stream and said second end being positioned to extend into an oil supply;

said body being provided with a pair of generally parallel passageways;

one first of said passageways extending from said first end to an enclosed oil supply cavity and one second of said passageways extending from said first end to an oil supply in said oil supply cavity;

said first of said passageways being positioned in said air stream such as to primarily receive impact air to pressurize said oil supply cavity;

said second of said passageways being positioned in said air stream to receive less impact air whereby said second of said passageways is at a lower pressure than said first of said passageways in a first direction of air flow and said oil supply cavity and oil is delivered from said oil supply through said second of said passageways to said first end of said body for dispersion into said air stream when said air stream is flowing in said first direction of air flow; and means for minimizing impact air in a second direction of air flow on both said passageways.

2. A lubricator according to claim 1, wherein said elongate body further comprises a cylindrical body adapted for installation in a cylindrical bore and said means for minimizing impact air in a second direction of air flow comprises a step on said first end angled to the direction of air flow.

3. A lubricator according to claim 1, wherein said elongate body is disposed at an angle other than perpendicular to said air stream.

4. A lubricator according to claim 1, wherein said air steam is defined by an air inlet of a power tool.

5. A lubricator according to claim 1, wherein said oil supply cavity is defined within a power tool.

6. A lubricator according to claim 2, wherein said first of said passageways precedes said second of said passageways on a raised step on said first end of said elongate body in said air stream.

7. A lubricator according to claim 1, wherein said one first of said passageways is located on a step on said first end of said body projecting further into said air stream than said one second of said passageways.

8. A lubricator according to claim 6, wherein said elongate body is disposed at an angle of approximately 45 degrees to said air stream.

9. A lubricator for inclusion in a power tool comprising:

an elongate cylindrical body having a first and second end each formed substantially perpendicular to an elongate axis and an encircling periphery extending generally about said elongate axis;

said first end being positioned to extend into an air stream and said second end being positioned to extend into an oil supply;

said body being provided with a pair of generally parallel passageways;

one first of said passageways extending from an extended portion of said first end to an enclosed oil supply cavity and one second of said passageways extending from a recessed portion of said first end to an oil supply in said oil supply cavity;

said first of said passageways being positioned in an air stream such as to primarily receive impact air to pressurize said oil supply cavity; and said second of said passageways being positioned in said air stream to receive less impact air whereby said second of said passageways is at a lower pressure than said first of said passageways and said oil supply cavity and oil is delivered from said oil supply through said second of said passageways to said first end of said body for dispersion into said air stream when said air stream is flowing.

10. A lubricator according to claim 9, wherein said elongate cylindrical body is disposed at an angle of approximately 45 degrees to said air stream.

11. A lubricator according to claim 9, wherein said lubricator is mounted in a cylindrical bore disposed between an inlet air supply passageway and an oil reservoir.

12. A lubricator for inclusion in a power tool according to claim 11, wherein said lubricator is provided with an "0" ring seal between said lubricator and said bore.

* * * * *